United States Patent [19]
Carper

[11] Patent Number: 5,615,723
[45] Date of Patent: Apr. 1, 1997

[54] EXTENSION SPRING SYSTEM FOR AN OVERHEAD DOOR

[75] Inventor: Kenneth E. Carper, Madeira, Ohio

[73] Assignee: Clopay Building Products Company, Inc.

[21] Appl. No.: 435,965

[22] Filed: May 5, 1995

Related U.S. Application Data

[63] Continuation-in-part of Ser. No. 288,328, Aug. 10, 1994, Pat. No. 5,577,544, which is a continuation-in-part of Ser. No. 262,135, Jun. 16, 1994.

[51] Int. Cl.⁶ .................................................... E05F 11/00
[52] U.S. Cl. ........................... 160/191; 160/201; 49/200; 16/197; 254/343
[58] Field of Search ...................................... 160/191, 192, 160/318, 201; 267/69, 73, 277; 49/200; 185/39, 44; 16/197, 198; 254/343

[56] References Cited

U.S. PATENT DOCUMENTS

| | | |
|---|---|---|
| 1,183,254 | 5/1916 | Tony . |
| 1,992,006 | 2/1935 | Greegor . |
| 1,994,142 | 3/1935 | Madsen . |
| 2,032,951 | 3/1936 | Pixley . |
| 2,083,467 | 6/1937 | Morris . |
| 2,097,242 | 10/1937 | Robinson . |
| 2,314,015 | 3/1943 | Parsons . |
| 2,630,597 | 3/1953 | Robinson . |
| 2,786,231 | 3/1957 | Robinson . |
| 2,858,946 | 11/1958 | Breed .................. 254/343 X |
| 2,932,057 | 4/1960 | Pemberton . |
| 3,240,484 | 3/1966 | Klamp . |
| 3,265,362 | 8/1966 | Moody ..................... 254/343 |
| 3,412,423 | 11/1968 | Binns . |
| 3,635,277 | 1/1972 | Bahnsen . |
| 3,876,183 | 4/1975 | Strout et al. ........... 254/343 X |
| 3,876,184 | 4/1975 | Eudy ....................... 254/343 |
| 3,921,761 | 11/1975 | Votroubek et al. . |
| 3,958,367 | 5/1976 | Fairman . |
| 4,003,102 | 1/1977 | Hawks et al. . |
| 4,057,219 | 11/1977 | Sobolewski . |
| 4,082,133 | 4/1978 | Halopoff . |
| 4,175,475 | 11/1979 | Eckhardt . |
| 4,191,237 | 3/1980 | Voege . |
| 4,301,623 | 11/1981 | Demukai . |
| 4,316,493 | 2/1982 | Arena . |
| 4,522,245 | 6/1985 | Anderson . |
| 4,590,639 | 5/1986 | Fritsche et al. . |
| 4,640,049 | 2/1987 | Duncan . |
| 4,681,307 | 7/1987 | Leonard . |
| 4,686,739 | 8/1987 | Fritsche et al. . |
| 4,731,905 | 3/1988 | Milano et al. . |
| 4,757,853 | 7/1988 | Price . |
| 4,882,806 | 11/1989 | Davis . |
| 4,930,182 | 6/1990 | Eichenberger . |
| 4,976,168 | 12/1990 | Lotznicker et al. . |
| 4,981,165 | 1/1991 | Miller et al. . |
| 5,036,899 | 8/1991 | Mullet . |
| 5,135,040 | 8/1992 | Ruiter . |
| 5,239,777 | 8/1993 | Husselton . |
| 5,275,223 | 1/1994 | Magro et al. . |

OTHER PUBLICATIONS

Brochure, "The Counterbalance Evolution!", Wayne®Dalton, Mt. Hope, Ohio 44660, ©1993, Wayne–Dalton Corp.

Primary Examiner—Blair Johnson
Attorney, Agent, or Firm—Wood, Herron & Evans, P.L.L.

[57] ABSTRACT

An extension spring overhead door system in which the spring may be quickly and easily placed in tension with the door in a closed position. A spring tensioning device is provided which eliminates the need for multiple installers to lift the full weight of the door and then clamp or otherwise prop the door in an open position. An extension spring containment tube is also provided which surrounds the entire periphery of the spring to fully contain the entire length of the extension spring.

12 Claims, 6 Drawing Sheets

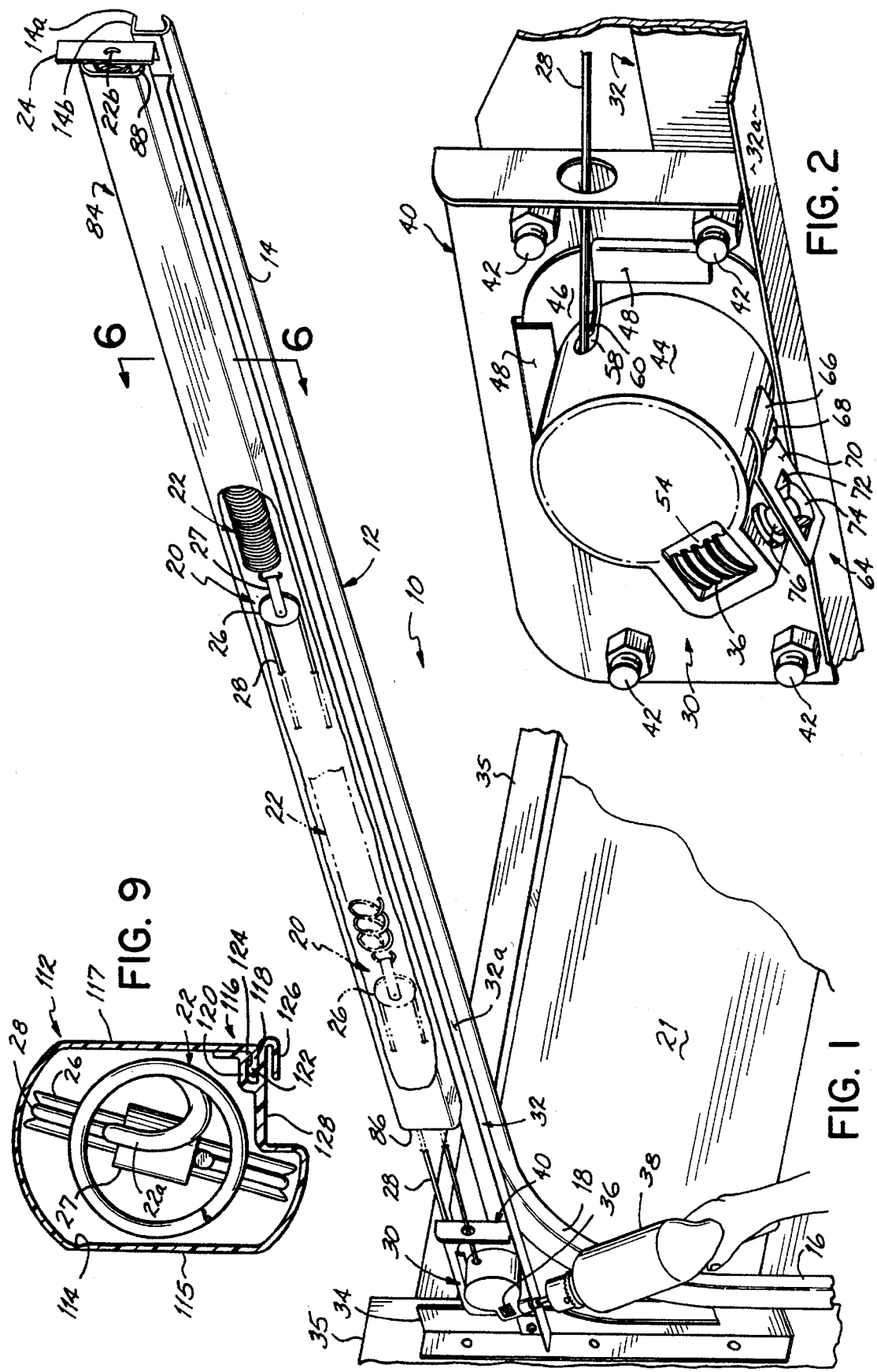

EXTENSION SPRING SYSTEM FOR AN OVERHEAD DOOR

This application is a continuation-in-part application of U.S. patent application Ser. No. 08/288,328, filed on Aug. 10, 1994, patent No. 5,577,544, which is a continuation-in-part application of U.S. patent application Ser. No. 08/262,135, filed on Jun. 16, 1994.

BACKGROUND OF THE INVENTION

This invention generally relates to overhead doors and, more specifically, to an improved extension spring counterbalancing mechanism used in overhead doors, such as residential garage doors.

Overhead doors generally require a counterbalancing force which enables the door to be more easily moved between opened and closed positions either manually or by way of a powered opening device. Often, overhead door systems rely on one or more extension springs, placed in tension when the door is in a closed position, so as to provide the desired counterbalancing force. In extension spring counterbalancing systems, the tension in the spring is released as the door is lifted thereby effectively reducing the weight of the door which must be lifted either by the motor of a door opener or by hand. These extension springs must be stretched or extended during the installation of the overhead door such that they are supplied with the necessary counterbalancing tension.

Presently, installation and adjustment of extension spring systems involve labor intensive procedures on the part of the installer. That is, in order for the installer to stretch or extend the spring, the full weight of the overhead door, which may be 200–300 pounds, must be manually lifted and clamped or otherwise propped up in a fully opened position. This procedure usually requires three people, i.e., two people for lifting the door and one more for clamping it in the open position. The operating cable of the door is then attached to the free end of the spring. Since the other end of the spring is fixed, the spring is tensioned when the door is lowered to the closed position. Similar labor intensive procedures must be followed to make any subsequent adjustment to the spring tension.

Another problem associated with overhead doors utilizing extension spring counterbalancing systems concerns the prevention of damage and/or injury resulting from the spring breaking while under tension. Past solutions to this problem have generally involved the use of a rope or cable passed centrally through the spring. Such safety cables are disclosed in U.S. Pat. Nos. 3,958,367; 4,082,133; and 4,640,049.

U.S. Pat. No. 4,757,853 discloses the combined use of a safety rope extending centrally through the spring and a pair of metal end caps placed over the two ends of the spring. The purpose of the two end caps is stated to be for containment of the extreme ends of the spring through which the safety rope does not extend. While such end caps may provide containment for the ends of the spring, this safety system still does not provide full containment for the entire length of the spring and, in addition, adds undesirable complexity to the overhead door system.

Still further disadvantages of existing systems involve the high costs of manufacturing and stocking parts respectively dedicated only to the left or right hand side of the overhead door. Overall, past extension spring based counterbalancing systems for overhead doors have generally been rather simple in design but difficult and labor intensive to install.

A need in the art therefore exists for improvements in the art of overhead doors employing extension springs. Specifically, an extension spring system is needed which allows easier installation of the overhead door, especially with regard to the procedures involved with supplying counterbalancing tension to the spring. Such a counterbalancing mechanism would be even more desirable from an economic and versatility standpoint if the same spring tensioning components may be easily installed on either the left or right side of the overhead door. Furthermore, a system is needed which provides for full containment of the extension spring.

SUMMARY OF THE INVENTION

The present invention therefore provides an extension spring overhead door system in which the spring may be quickly and easily placed in tension with the door in a closed position. The present invention therefore eliminates the need for multiple installers to lift the full weight of the door and then clamp or otherwise prop the door in an open position. Subsequent adjustments to the spring tension are likewise easily accomplished without the extensive labor of conventional systems. The present invention further provides an extension spring containment tube which extends around the entire periphery of the spring to fully contain the entire length of the extension spring. This feature of the invention more completely guards against damage and injury from spring pieces should the spring break under tension.

In general, the present invention provides a method of counterbalancing an overhead door with an extension spring while the overhead door remains in a closed position. The method generally includes the steps of:

1) connecting one end of the extension spring to stationary frame structure;
2) connecting an opposite free end of the extension spring to an operating cable of the overhead door;
3) pulling the operating cable while the door remains closed to stretch the extension spring; and,
4) locking the operating cable after reaching a predetermined stretched spring length.

In accordance with one aspect of the invention, a rotatable spool carries an operating cable of the extension spring system. The operating cable is connected to a free end of the spring while the other end of the spring is fixed to a support frame located generally adjacent an inner end of a horizontal portion of the door track. The spool is mounted for rotation generally adjacent the opposite end of the horizontal track located adjacent the door opening. A rotation and locking mechanism is provided and operatively connected to the spool such that, with the door remaining as installed in its closed position, the spool may be rotated to wind the cable and then effectively locked at a desired position. This stretches or extends the spring to the desired counterbalancing tension and maintains it at that tension with the door closed. Preferably, the spool is rotated by a power tool to make the installation procedure and any necessary subsequent adjustments that much easier on the installer.

More specifically, the principles of this first aspect of the invention are preferably embodied in a rotatable spool connected for rotation with a ring-shaped spur gear. The spur gear and spool may formed integrally from a metal, such as an aluminum alloy, or from a plastic, such as fiber glass reinforced Nylon. In each embodiment of the present invention, a worm drive gear engages the spur gear and includes a tool engageable nut on one end which allows a power tool to be used to rotate the worm drive gear and thereby rotate the spur gear and spool. The worm drive gear extends downwardly at an angular orientation defined between vertical and approximately 45° to be easily accessed by an installer. The cable extends from the spool around a pulley attached to a free end of the extension spring, over a fixed pulley attached to support structure at the front of the horizontal track section and is finally fixed to the bottom of the door.

The worm drive gear provides a lock against rotation for the spool since it will effectively restrain the spur gear and the spool from rotating after the installation procedure is complete. As an added measure of assurance against rotation of the spur gear and spool after installation, a gear retainer may be used which engages the winding mechanism to restrain the spur gear and worm drive gear from rotating during normal operation of the door. One such gear retainer is disclosed in co-pending related U.S. patent application Ser. No. 08/262,135 which is fully and expressly incorporated herein by reference.

In another aspect of the invention, a tubular protective spring cover is provided for fully enclosing at least the entire periphery of the spring and thereby protecting surrounding objects or persons from damage or injury should the spring break under tension. The tubular cover is shaped to allow the pulley attached to the free end of the spring to travel with the tube as the spring is tensioned and untensioned either during the installation procedure or during operation of the door. The cover includes at least one opening along the entire length. This opening includes a closure to allow the cover to be easily installed and removed from the spring. Preferably, the tube is extruded from flexible plastic, such as polypropylene, and includes a shaped profile and retaining means for allowing the cover to be removably affixed to a horizontal portion of the door track. In the preferred embodiment, the cover is biased in a normally open state for easy application to the spring. In another embodiment, the extruded tube includes an integral hinge for allowing easy opening and closing of the tube, for example, during installation and/or removal thereof.

A second embodiment of the tensioning mechanism of this invention is provided which allows easier attachment of the housing containing the integral ring gear and spool or "geared spool" to a mounting bracket. In this regard, mating mounting structure on the housing and the bracket eliminates the need for separate fasteners or the more involved mounting procedure of the first embodiment. Specifically, the mating mounting structure provides a simple snap-in connection between the geared spool housing and the mounting bracket. Moreover, this second embodiment is universal in the sense that the same geared spool and housing may be used on either or both the left and right hand side of the overhead door system by simply flipping the housing around and rotating it 90° Whether the housing is mounted on one side of the overhead door or the other, the worm is disposed in an easily accessible orientation such as the above-mentioned orientation of the first embodiment.

In the second embodiment, the worm is provided with drives on each end thereof extending from the housing such that one of the drives is easily accessible when the housing is mounted on either the left side or right side of the overhead door. The dual drive portions also provide a second location from which to engage the worm with a tool, such as in the case where one drive portion is damaged or stripped. The worm is also connected to the housing for engagement with the ring gear in an easy snap-in manner and, once the ring gear is inserted in the housing, the worm is securely trapped in place by the helical ring gear. Finally, the two drives allow the worm to be inserted in either of two possible orientations while still ensuring a drive being located at the "user friendly" orientation.

A universal mounting bracket is also provided and may be mounted on either the left or right hand side of the overhead door for mounting the universal geared spool housing.

Additional advantages of the present invention will become more apparent upon review of the following detailed description of the drawings.

BRIEF DESCRIPTION OF THE DRAWINGS

FIG. 1 is a perspective view of one side of an overhead door system including the extension spring tensioning mechanism and protective spring cover constructed in accordance with a first embodiment of the present invention;

FIG. 2 is an enlarged perspective view of the tensioning mechanism shown in FIG. 1;

FIG. 9 is a cross sectional view similar to FIG. 6 but showing one alternative embodiment of the tubular protective spring cover;

DETAILED DESCRIPTION OF THE PREFERRED EMBODIMENT

Figure 3:
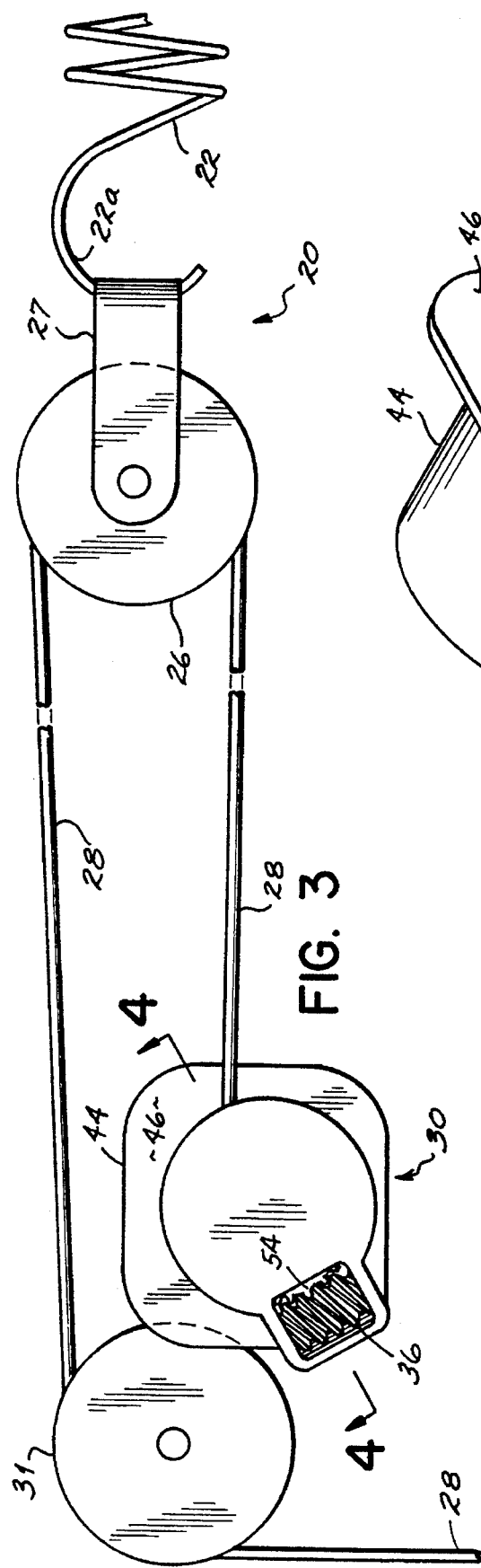
FIG. 3 is a side view schematically showing the connections between the tensioning mechanism and the tension spring of the present invention.

Turning first to FIG. 1, a portion of an overhead door system 10, such as a residential garage door system, is shown and includes conventional door suspending and guiding structure such as a track 12 having a horizontal section 14, a vertical section 16 and a curved section 18. Regarding the incorporation of a first embodiment of the present invention into overhead door system 10, a counterbalancing system 20 is provided for at least one side of an overhead door 21 and includes an extension spring 22 connected between a vertical angle bracket 24, which may be rigidly fastened to the ceiling of a garage, and a pulley 26. The connection to pulley 26 is made by way of a mounting bracket 27 which rotatably mounts pulley 26 and also receives a hook-shaped end 22a of spring 22.

In those overhead door applications requiring two extension springs, for example, a counterbalancing system 20 as described below will simply be duplicated on both sides of the door 21 adjacent to each horizontal track section 14. For simplicity, it will be understood that only one counterbalancing system 20 need be described herein.

Referring briefly to FIGS. 1 and 3, an operating cable 28 extends out of a spring tensioning device 30, constructed in accordance with a first embodiment of the present invention, and around pulley 26. The other end of operating cable 28 is rigidly attached to the bottom of the overhead door 21 in a conventional manner after passing over a second, stationary pulley 31. It will be appreciated that pulley 31 may be fixed to the same mounting plate as tensioning device 30 which is described in more detail below. Spring tensioning device 30 generally operates to wind cable 28 such that, with the door closed, spring 22 may be stretched generally from its initial contracted length as shown in solid in FIG. 1 to a stretched tensioned length shown in phantom in FIG. 1. In this way, spring 22 is placed in tension to assist with the opening of door 21. That is, spring 22 will contract as door 21 is opened and will thereby release the energy that was stored during the tensioning procedure to aid in lifting door 21.

As further shown in FIG. 1, a horizontal angle bracket 32 mounts the tensioning device 30 generally between horizontal track section 14 and a vertical flag bracket 34 which may be rigidly fastened to door frame structure 35 which defines the door opening in a conventional manner. Tensioning device 30 is preferably mounted so that it is disposed outside of track 12 and includes an easily accessible rotatably mounted drive worm 36 for enabling the cable winding and spring tensioning procedure in a manner to be detailed below. Worm 36 may be easily engaged by a power tool 38 held by an installer standing within the garage or other building structure behind door 21. Preferably, worm 36 is oriented between a vertical position and a position extending approximately 45° into the building structure so as to provide for easy accessibility.

As best shown in FIG. 2, a mounting plate 40 formed of sheet metal is rigidly secured to horizontal bracket 32 by bolts 42. Tensioning device includes a housing 44, which may be formed of metal or plastic, having a flange portion 46 for allowing tensioning device 30 to be mounted to plate 40. Specifically, flange portion 46 of housing 44 is secured beneath a plurality of sheet metal retaining lips or tabs 48 extending from an outer side of mounting plate 40. Preferably, there are three such lips or tabs 48, although only two are shown in FIG. 2. Housing 44 of spring tensioning device 30 is initially secured to mounting plate 40 by way of flange portion 46 registering under retaining lips 48 disposed above and on two sides of housing 44. Then, mounting plate 40 is secured to bracket 32 with bolts 42 so that horizontal portion 32a of bracket 32 acts as a fourth retaining means on the lower side of housing 44. Of course, other ways of fastening housing 44 to mounting plate 40 and/or bracket 32 are also contemplated.

Figure 10:
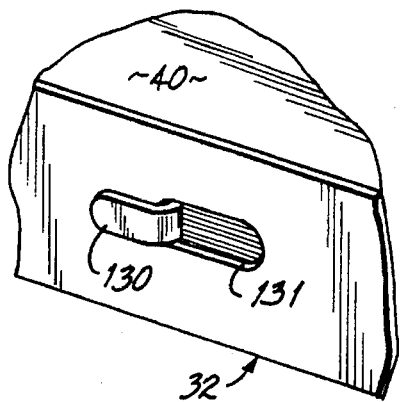
FIG. 10 is a view from the opposite side of the mechanism shown in FIG. 2 illustrating a safety hook for holding the mechanism onto the horizontal door track.

FIG. 10 is a view from the opposite side of the tensioning device 30 illustrating a safety hook 130 for holding the plate 40 secured to bracket 32 when the bolts 42 are removed. The safety hook 130 registers with the slot 131 in bracket 32 by insertion towards the rear door track. Thus, in the event that the bolts 42 are removed when the spring of device 30 is under tension, the safety hook 130 will retain device 30 and prevent it from flying off the bracket 32.

Figure 5:
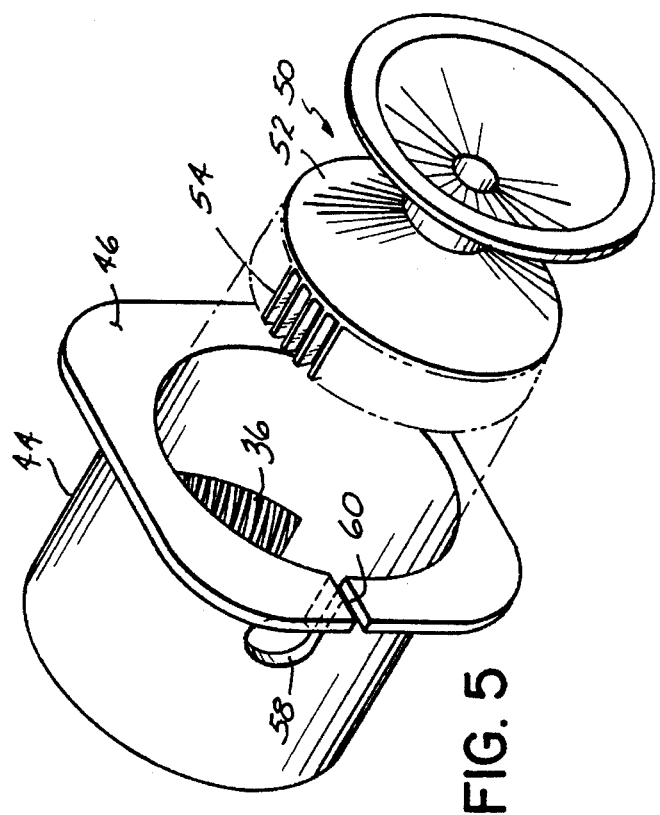
FIG. 5 is an exploded perspective view of the tensioning mechanism diagrammatically illustrating the housing and geared spool of the invention.
Figure 4:
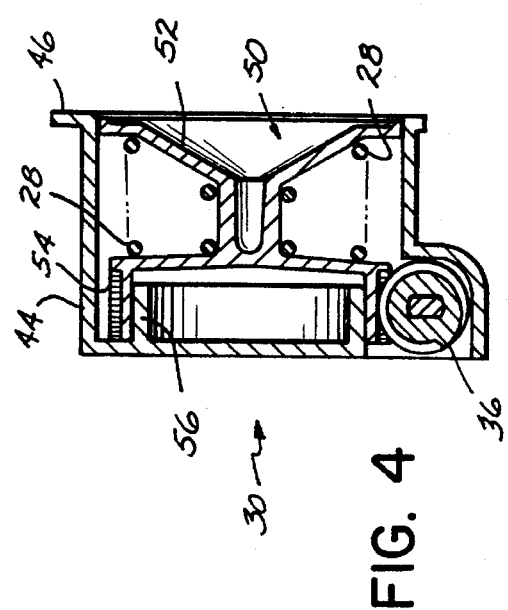
FIG. 4 is a cross sectional view of the tensioning mechanism taken along line 4—4 of FIG. 3.

Turning now to FIGS. 4 and 5, spring tensioning device 30 comprises a geared spool 50 for receiving, winding and unwinding operating cable 28. Geared spool 50 may be integrally molded from a polymeric plastic, aluminum or other plastic material, for example, and includes a spool portion 52 having one end of cable 28 connected thereto and a gear portion 54. Preferably, gear portion 54 is formed as a spur gear, i.e., a ring gear having outer teeth which extend parallel to its axis of rotation. Geared spool 50 is rotatably received within housing 44 by registration of gear portion 54 about an inner hub 56 of housing 44 as shown in FIG. 4. Housing 44 may also be formed from a plastic, and therefore friction between the inside of gear portion 54 and the outside of hub 56 is minimal. Worm 36 may also be formed from an acetal plastic to reduce friction with gear portion 54 of geared spool 50. Geared spool 50 is mounted within housing 44 such that gear portion meshes with worm 36 as shown in FIG. 4. In this way, rotation of worm 36 in one direction will rotate geared spool 50 in a corresponding direction to wind cable 28 about spool portion 52 and rotation of worm 36 in the opposite direction will correspondingly unwind cable 28 from spool portion 52. As further shown in FIG. 5, housing 44 includes a hole 58 and a slot 60 for allowing geared spool 50 to be assembled with housing 44 and cable 28 (FIG. 2) to pass through housing 44.

In another aspect of the invention shown in FIG. 2, a gear retainer 64 is provided for selectively preventing rotation of worm 36 and geared spool 50. Gear retainer 64 operates in a substantially identical manner to the gear retainer disclosed in the above incorporated related application Ser. No. 08/262,135. Specifically, gear retainer 64 comprises a resilient spring clip 66 which is rigidly secured to housing 44 by a fastener 68 and includes an angled, resilient portion 70 extending outwardly from housing 44. Resilient portion 70 of spring clip 66 includes an aperture 72 which normally engages a hex drive head 74 in the clip's unbiased state so as to prevent rotation of worm 36. When resilient portion 70 is pushed inwardly by a tool engaging hex drive head 74, aperture 72 is aligned about stepped down or recessed portion 76 and head 74 is free to rotate. Worm 36 may therefore also be rotated to either wind or unwind operating cable 28 to respectively tension or untension spring 22 (FIG. 1).

Another feature of the present invention is illustrated in FIGS. 1 and 6–8. Specifically, as shown in FIG. 1, a tubular spring cover 84 is provided for surrounding at least the outer periphery of spring 22 when the spring 22 is either at its contracted, untensioned length, shown in solid, or at a stretched or tensioned length as shown in phantom. Cover 84 is preferably formed from polypropylene, PVC, metal or other plastics. As will be appreciated from the illustrated movement of spring 22 and pulley 26 in FIG. 1, cover 84 is dimensioned to allow longitudinal and rotational movement of pulley 26 during tensioning and untensioning of spring 22. While angle member 24 will provide some containment capability for end 88, removable end caps (not shown) may optionally be provided at one or both ends 86, 88 of cover 84 to provide for full containment and protection of spring 22. Of course, suitable apertures would have to be provided in such end caps to allow for passage of cable 28 at end 86 and of the hook portion of spring 22b at end 88.

Figure 6:
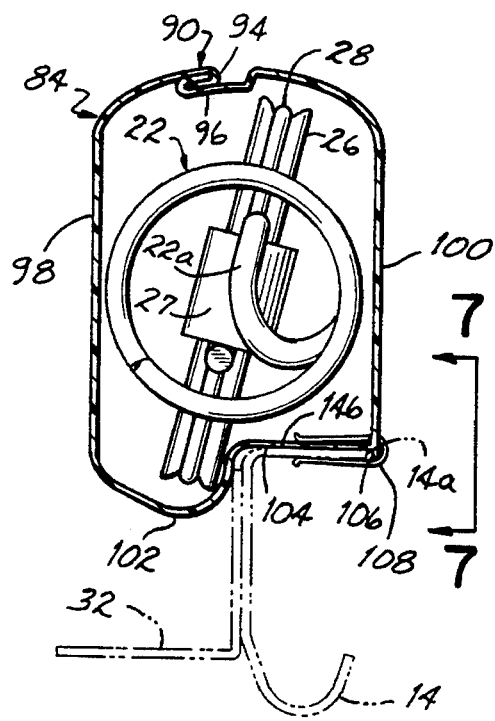
FIG. 6 is a cross sectional view of the tension spring and one preferred embodiment of a tubular protective spring cover taken along line 6—6 of FIG. 1.
Figure 7:
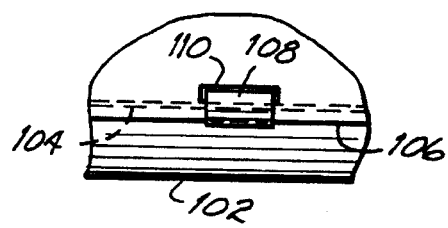
FIG. 7 is a view taken along line 7—7 of FIG. 6 and showing one preferred manner of fastening the cover to a horizontal door track section.
Figure 8:
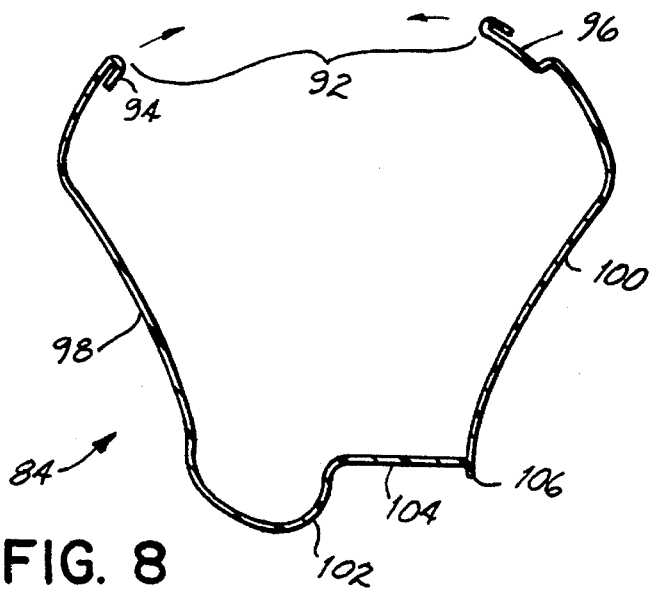
FIG. 8 is a cross sectional view similar to FIG. 6 but showing the preferred spring cover in its normally open state with other structure being deleted for clarity.

Referring now to FIG. 6 taken in conjunction with FIG. 8, cover 84 includes a closure 90 generally defining a resealable opening 92. Specifically, closure 90 comprises a pair of hook-shaped clasp members 94, 96 extending along the entire length of cover 84. Cover 84 is molded or extruded such that two side walls 98, 100 are biased in a normally open condition to expose opening 92 as shown in FIG. 8. A shaped bottom wall 102 is provided for accommodating pulley 26 and includes a planar portion 104 adapted to rest on top of an upper surface 14b of horizontal track section 14. A slight vertically depending edge 106 is further provided for abutting against an upper edge 14a of horizontal track section 14. Finally, as shown in FIGS. 6 and 7, a plurality of clips 108 (only one of which is shown) are provided along the length of cover 84 for fastening cover 84 to horizontal track section 14. Each clip 108 extends through an aperture 110 in cover 84 and clips bottom wall 102 to upper surface 14b of track section 14.

One alternative embodiment for a fully enclosing spring cover is shown in FIG. 9. In this regard, a tubular spring cover 112 is provided for completely enclosing extension spring 22 when it is either in a tensioned, stretched state or in an untensioned, contracted state. Cover 112, like cover 84 of the preferred embodiment, is preferably formed of polypropylene, PVC, metal or other plastics. Cover 112, however, is not molded to be in a normally open position but instead includes an integral hinge 114 extending along an upper edge and a closure 116 extending along a lower edge. Hinge 114 essentially allows two halves 115, 117 of cover 112 to be separated or folded away from each other at closure 116. Closure 116 includes a male portion 118 and a mating female portion 120. Mating portions 118, 120 include respective nubs 122, 124 for maintaining the connection therebetween. Closure 116 allows cover 112 to be opened along its entire length for the purposes of installation and removal of cover 112 or simply accessing spring 22. Cover 112 further includes a retaining lip 126 and a horizontal bottom support surface 128 for allowing removable attachment of cover 112 to horizontal track section 14. In this regard, upper edge 14a (FIG. 1) of horizontal track section 14 may be inserted into retaining lip 126 and support surface 128 may rest on top of the upper surface 14b of horizontal track section 14.

Figure 11:
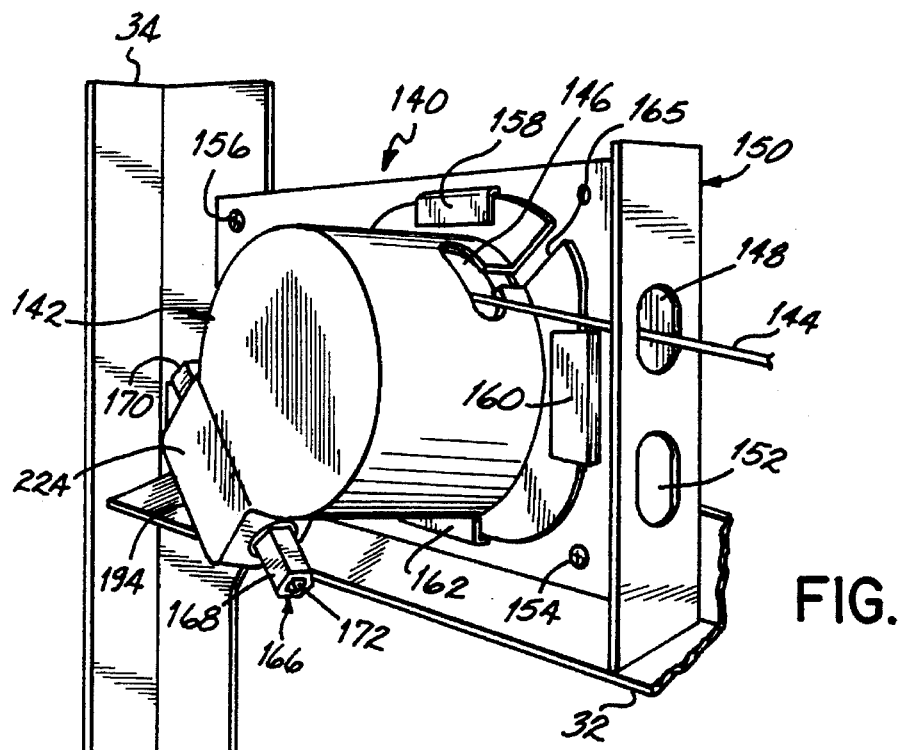
FIG. 11 is a perspective view of a second embodiment of a geared spool housing shown mounted on the left hand side of an overhead door assembly as viewed from behind the door.

FIG. 11 illustrates a spring tensioning mechanism 140 constructed in accordance with a second embodiment of the present invention and mounted on the left side of the overhead door 21 (FIG. 1 ), as viewed from the inside thereof, in substitution for tensioning mechanism 30 of the first embodiment. Much of the structure associated therewith has been deleted for clarity so as to focus on the unique aspects of this embodiment as compared to the first embodiment. It will be understood that all of the structure of the overhead door system which is not shown in FIG. 11 and the subsequent figures may be arranged and connected together just as illustrated and described with respect to the first embodiment.

More specifically, FIG. 11 shows a geared spool housing 142 having an operating cable 144 extending therefrom through an elongated slot 146 in housing 142 and a hole in a mounting bracket 150. Mounting bracket 150 includes another hole 152 through which cable 144 extends when bracket 150 and housing 142 are mounted on the right side of the overhead door (not shown) as viewed from inside the door. Mounting bracket 150 is rigidly fastened to horizontal and vertical frame members 32, 34 by a plurality of fasteners 154, 156, only two of which are shown in FIG. 11. Bracket 150 includes three flange mounts 158, 160, 162 which receive a mounting flange 164 of housing 142 in a sliding manner generally from left to right as viewed in FIG. 11 and as will be more fully understood from the description to follow. Mounting flange includes a slot 165 communicating with slot 146 for the geared spool, discussed briefly below, to be easily installed with cable 144 extending outwardly therefrom. As with the first embodiment, housing 142 includes a worm 166 for effecting a pulling action on cable 144 and the attached extension spring (not shown) in the same manner as the first embodiment. Worm 166 includes drive portions 168, 170 at each end thereof for engagement with a tool. Drives 168, 170 comprise external hex elements, although internal hex drives 172 (only one being shown) are also provided for versatility purposes.

Figure 12:
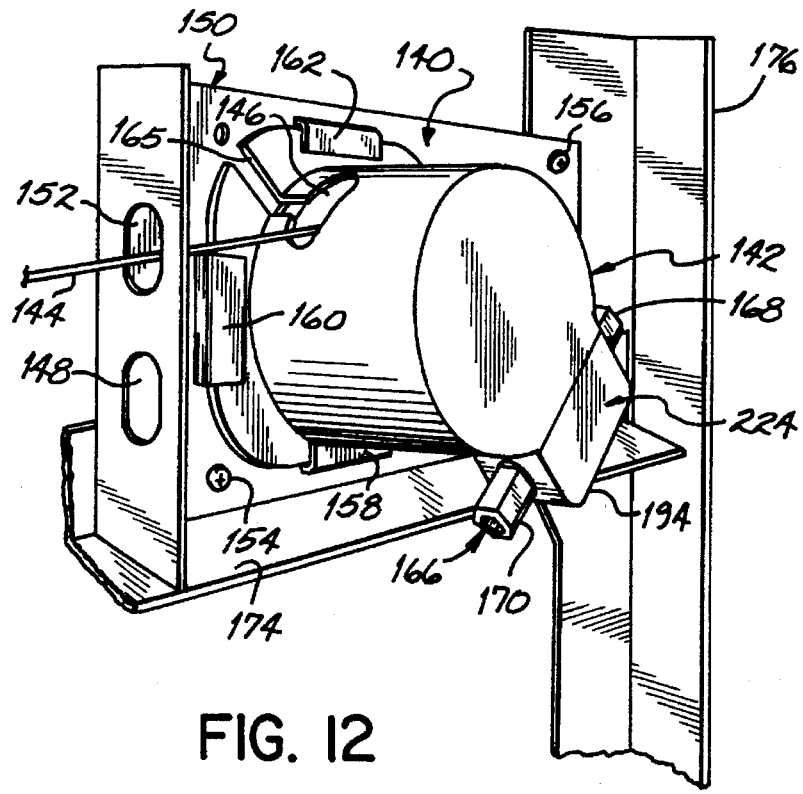
FIG. 12 is a perspective view of the geared spool housing of FIG. 11 shown mounted on the right hand side of an overhead door assembly as viewed from behind the door.

FIG. 12 shows spring tensioning mechanism 140 mounted on the right hand side of an overhead door system as viewed from inside the door (not shown). It will be appreciated that bracket 150 and housing 142 have been flipped over. Also, housing 142 has been taken out of flange mounts 158, 160, 162, rotated 90° to the position shown and reinserted in flange mounts 158, 160, 162. Bracket 150 has then been mounted to horizontal and vertical frame members 174, 176 by fasteners 154, 156 in exactly the same manner as with the left hand side mounting shown in FIG. 11. It will further be appreciated that when bracket 150 and housing 142 have been mounted as shown in FIG. 12, worm drive 170 is disposed in the "user friendly" 45° orientation rather than worm 168 as in the case of the left side mounting of FIG. 11. Also, cable 144 extends through hole 152 rather than hole 148 in mounting bracket 150. The elongated nature of slot 146 in housing 142 allows cable 144 to extend out from a respective end thereof in each of the mounting orientations shown in FIGS. 11 and 12.

Figure 13:
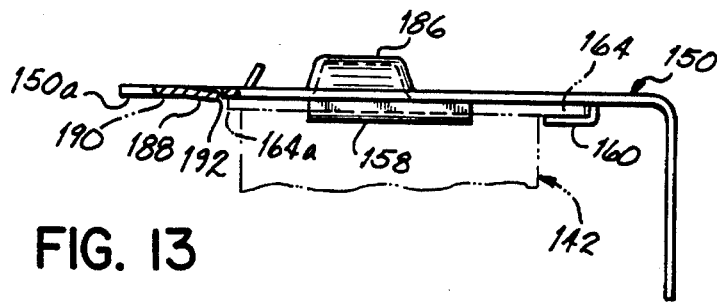
FIG. 13 is a top view of a mounting bracket for the geared spool housing.
Figure 14:
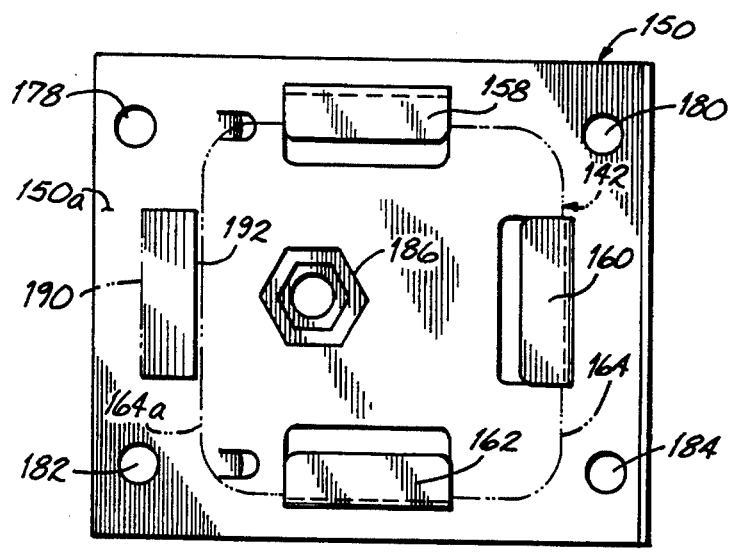
FIG. 14 is a side elevational view of the mounting bracket shown in FIG. 13.

Mounting bracket 150 and the snap-in attachment of housing 142 are best illustrated by FIGS. 13 and 14. Mounting bracket 150 includes four mounting holes 178, 180, 182, 184 for mounting bracket either as shown in FIG. 11 or 12. Mounting bracket 150 also includes a hex emboss 186 for receiving a hex nut (not shown). This hex nut is used to mount a pulley (not shown) which corresponds in function to pulley 31 of the first embodiment.

Housing 142, and specifically flange 162, shown in dotted lines, is inserted in a sliding fashion from left to right as viewed in FIGS. 13 and 14. That is, flange 164 is slid over a barbed or tapered element 188 which tapers upwardly from surface 150a of bracket 150. Tapered element 188 simply comprises a stamped out portion of bracket 150 as is apparent from FIG. 13. Flange 164 then slides beneath flange mounts 158, 160, 162, up and over barbed or tapered element 188 from a first edge 190 which is even with surface 150a (FIG. 13) to a second raised edge 192, until edge 164a of flange 164 snaps over raised edge 192 and is thereby held in place. When it is desired to remove housing 142 from bracket 150, tapered element 188 may be pushed in to lower raised edge 192 and allow flange edge 164a to pass over.

Figure 15:
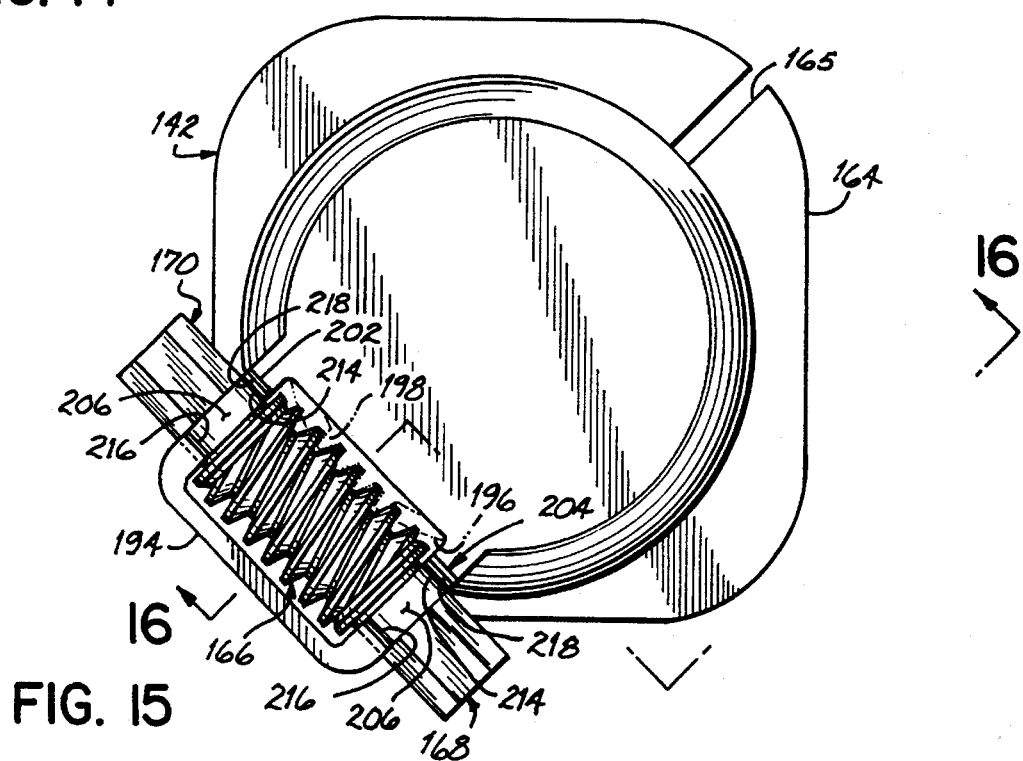
FIG. 15 is a side elevational view of the geared spool housing and meshing gears of the second embodiment; and, FIG. 16 is a fragmentary cross sectional view of the geared spool housing taken generally along line 16—16 of FIG. 15.
Figure 16:
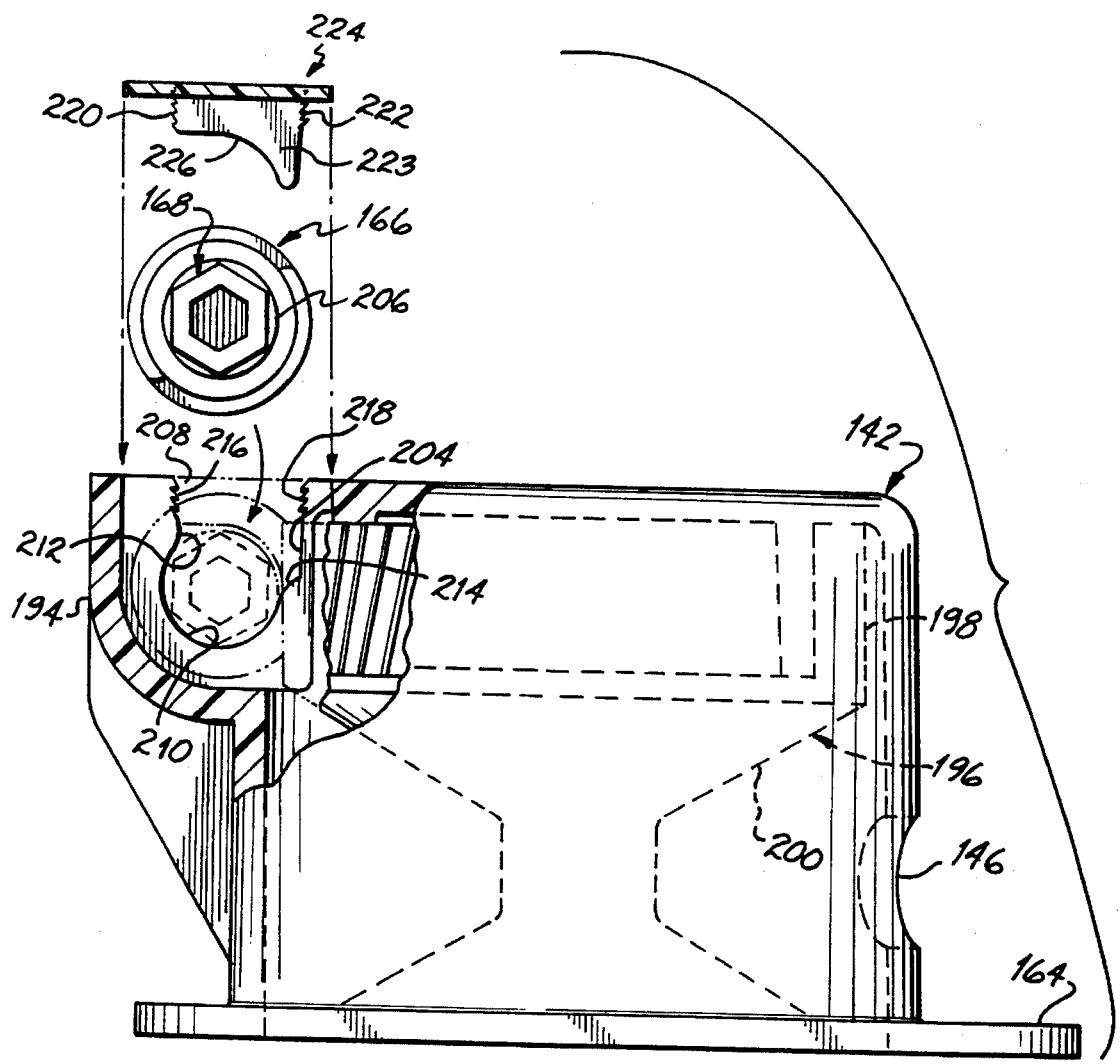

As shown in FIGS. 15 and 16, worm 166 is mounted for rotation within a worm housing portion 194 of housing 142 such that worm 166 is in intermeshing engagement with a gear spool 196 also mounted for rotation within housing 142. As shown best in FIG. 16, geared spool 196 comprises an integrally formed element having a ring gear portion 198 and a spool portion 200, as in the first embodiment. Ring gear portion 198 preferably comprises a helical gear in the second embodiment.

Worm housing 194 includes a pair of end slots 202, 204 (FIG. 15) for receiving cylindrical shaft portions 206 (only one being shown in FIG. 16) disposed at opposite ends of worm 166. Each slot 202, 204 and the mounting of worm 166 therein is identical and therefore the description of slot 202 and cylindrical shaft 206 will be understood to apply to both. Slot 202 includes an open end 208 and a closed curved end 210 which receives cylindrical shaft 206 of worm 166 for rotation. A pair of inward projections or curved "bumps" 212, 214 keep shaft 206 within the closed curved portion 210 of slot 206 as shown in FIG. 16. It will be appreciated that shaft 206 is received past bumps or projections with a "snap fit".

Referring specifically to FIG. 16, curved end 210 has a radius of curvature substantially equal to the radius of cylindrical shaft 206. Curved end 210 forms slightly more than a semi-circular curve between projections 21 2, 214 such that cylindrical shaft 206 is firmly held in place for rotation in closed end 210 by projections 212, 214. To help ensure that worm 166 is retained firmly in worm housing 194, ratchet teeth 216, 218 are provided on opposing sides of slot 202 for engaging ratchet teeth 220, 222 on one end 223 of a retainer piece 224. Retainer piece 224 includes two ends with the second end (not shown) closing slot 204 in exactly the same manner that end 223 closes slot 202. Retainer piece 224 includes a curved surface 226 for engaging or at least following the outer surface of cylindrical shaft 206 of worm 166. Retainer piece 224 is simply pushed into slot 202 once worm 166 has been inserted into worm housing 194 as shown in dotted lines in FIG. 16. Ratchet teeth 216, 218 engage respective ratchet teeth 220, 222 to prevent retainer piece 224, and therefore worm 166, from coming loose or coming completely out of housing 194. It will be appreciated that the main retention for worm 166 within housing 194 is provided by helical ring gear portion 198 of geared spool 196 since the teeth of gear portion 198 trap worm 166 within housing 194 preventing withdrawal out slots 202, 204.

Operation

Referring generally to FIG. 1, after the overhead door system 10 and counterbalancing mechanism 20 have been installed with door 21 in a closed or down position, cover 84 is installed over the stretched spring 22 by releasing closure element 90, if necessary, to expose opening 92 as shown in FIG. 8 and then inserting cover 84 over spring 22. Closure 90 is then snapped closed by engaging clasps 92, 94 with one another. Finally, cover 84 is secured to horizontal track section 14 by clips 108 as shown in FIGS. 6 & 7.

After the optional cover 84 is installed, drive head 74 of worm 36 is engaged with an appropriate tool 38 to disengage gear retainer 64. The installer then rotates worm 36 clockwise as viewed from the perspective of the installer. This rotates geared spool 50 and winds cable 28 about spool portion 52 thereby pulling cable 28 against the force of spring 22 and the weight of door 21 to which the end of cable 28 is attached. This moves pulley 26 toward tensioning device 30 and stretches spring 22 to thereby provide the necessary counterbalancing force for the door through cable 28. Preferably, the length of cover 84 is chosen in conjunction with the necessary tensioned or stretched length of the spring 22 such that the installer can stop stretching spring 22 when pulley 26 is generally flush with end 86 of cover 84 and the spring 22 will thereby be provided with the proper counterbalancing tension.

The operation of the mechanism 140 shown in FIGS. 11–16 may be carried out in the same manner as described above with respect to the first embodiment, once installed in the manner described.

Although preferred embodiments of the invention have been detailed above, those of ordinary skill in the art will readily recognize modifications thereof and substitutions of various components which do not depart from the spirit of the invention. For example, although a geared spool and worm assembly has been shown and described as the preferred embodiment, it will be appreciated that other conventional components may be substituted for winding the cable and/or stretching the spring in a manner which eliminates the necessity for lifting the full weight of the door and clamping or otherwise propping the door up during installation. In its broader aspects, therefore, the present invention is not limited to a gear and spool arrangement for accomplishing this objective. In addition, it is contemplated that other gear retainers may be utilized for restraining the spool from rotation after the initial tensioning procedure. For example, in the gear system of the preferred embodiment, worm 36 may have a drive bolt extending completely through it in a manner which allows the worm 36 to be selectively tightened down against housing 44 to selectively prevent rotation of worm 36 and geared spool 50. One alternative to the use of selectively operable gear retainer is also contemplated. In this regard, a spring washer may be used between housing 44 worm 36 so as to provide a constant resistance against rotation of worm 36. The force of this resistance is, of course, nevertheless designed to be overcome by deliberate rotation of worm 36 such as with tool 38.

With these and other additions and modifications taken into consideration, it is the Applicant's intent to be bound only by the scope of the appended claims.

What is claimed is:

1. An extension spring system for an overhead door system, said mechanism comprising:
    a first mounting bracket;
    a housing having mounting structure for mating with mounting structure on said first mounting bracket;
    a spool carrying a door operating cable, said spool being mounted for rotation within said housing;
    a ring gear connected for rotation with said spool;
    a worm mounted to said housing in intermeshing engagement with said ring gear;
    a second mounting bracket; and
    an extension spring connectable between said door operating cable and said second mounting bracket.

2. The mechanism of claim 1 wherein said ring gear is a helical gear and said worm is mounted between a pair of supports and is trapped in place between said supports by said helical gear.

3. The mechanism of claim 1 wherein the mounting structure of said housing and said bracket cooperates to enable said housing to be mounted in two selective orientations, one orientation being for mounting said housing on a left side of said overhead door and another orientation being for mounting said housing on a right side of an overhead door, wherein said worm presents an accessible drive portion thereof in each orientation.

4. The mechanism of claim 1 wherein the mounting structure on said housing and said bracket provides a snap locking between said housing and said bracket.

5. The mechanism of claim 4 wherein the mounting structure on said housing further comprises a flange and the mounting structure on said bracket further comprises flange mounts for receiving and retaining said flange.

6. The mechanism of claim 5 wherein said flange extends around a periphery of said housing and generally includes four sides surrounding said housing, wherein said bracket includes a flange mount disposed on each of three sides of said flange and an outwardly extending tab element over which the fourth side of said flange may slide and be locked in place.

7. The mechanism of claim 3 wherein said bracket includes two sections forming generally an "L" shape, wherein a first section includes mounting structure for said housing and a second section includes an opening for allowing said operating cable to pass through.

8. The mechanism of claim 7 wherein said second section includes two holes for allowing said operating cable to pass through in each of said orientations.

9. The mechanism of claim 1 wherein said worm includes two drive shaft portions mounted in slots of said housing with a snap fit.

10. An extension spring system for an overhead door, said system comprising:

an extension spring;

a support for mounting a first end of said extension spring;

a door operating cable having a first end for connection to said overhead door and a second end;

a support bracket;

a spring tensioning device mounted to said mounting bracket, said spring tensioning device including a cable winding spool receiving the second end of said cable, a rotational mount for said spool and a rotation and locking mechanism operatively connected to said spool and including a drive worm for allowing said spool to be rotated and then effectively locked after winding said cable and stretching said extension spring to a desired spring tension; and, mounting structure on said housing and said bracket cooperating to enable said housing to be mounted in two selective orientations, one orientation being for mounting said housing on a left side of said overhead door and another orientation being for mounting said housing on a right side of said overhead door, wherein said worm presents an accessible drive portion thereof in each orientation.

11. The extension spring system of claim 10 wherein said rotation and locking mechanism further comprises a gear system operatively connected to said spool.

12. The extension spring system of claim 11 wherein said gear system comprises a ring-shaped gear connected for rotation with said spool and a worm engaging said ring-shaped gear for rotating said ring-shaped gear and said spool and effectively locking said ring-shaped gear and said spool at a desired position.

* * * * *